(12) United States Patent
Veeramachaneni et al.

(10) Patent No.: US 7,986,716 B2
(45) Date of Patent: Jul. 26, 2011

(54) DATA TRANSFER DURING A CALL WITHOUT SIMULTANEOUS DATA CAPABILITIES

(75) Inventors: Jidesh Veeramachaneni, Redmond, WA (US); Ray Sun, Issaquah, WA (US); Shawn M. Brown, Redmond, WA (US); Zeke Koch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1309 days.

(21) Appl. No.: 11/138,228

(22) Filed: May 25, 2005

(65) Prior Publication Data

US 2006/0270388 A1    Nov. 30, 2006

(51) Int. Cl.
*H04J 1/02* (2006.01)
*H04M 3/42* (2006.01)
*H04M 11/00* (2006.01)

(52) U.S. Cl. ............... 370/494; 370/493; 379/90.01; 379/93.08; 379/201.01

(58) Field of Classification Search ............ 379/201.01, 379/93.13, 88.24, 90.01, 93.08, 283, 284, 379/88.13; 455/456, 552.1; 370/337, 494, 370/493; 340/407.1
See application file for complete search history.

(56) References Cited

U.S. PATENT DOCUMENTS

| | | | | | |
|---|---|---|---|---|---|
| 4,600,809 | A | * | 7/1986 | Tatsumi et al. | 379/88.24 |
| 5,757,890 | A | * | 5/1998 | Venkatakrishnan | 379/93.13 |
| 6,112,084 | A | * | 8/2000 | Sicher et al. | 370/337 |
| 6,184,796 | B1 | * | 2/2001 | Rivero et al. | 340/407.1 |
| 2002/0098849 | A1 | * | 7/2002 | Bloebaum et al. | 455/456 |
| 2006/0035666 | A1 | * | 2/2006 | Lai et al. | 455/552.1 |

* cited by examiner

*Primary Examiner* — Thjuan K Addy
(74) *Attorney, Agent, or Firm* — Merchant & Gould

(57) ABSTRACT

Systems and methods for transferring data over a voice channel during a voice communication connection (e.g., a telephone call) using DTMF signals over a single voice communication channel. The arbitrary data can include contact information, graphics, photographs, streaming media, interactive game information, location information, cached web pages, audio clips, etc. Some or all of the standard DTMF signals can be uniquely mapped to groups of bits. For example, the standard DTMF signals for numbers "0" through "7" can be mapped to the corresponding three-bit binary representations of those numbers. The arbitrary data can be placed in a container with meta-data indicating the start and end of the data, the type of the data, the amount of data, error correction/detection information, etc. The receiver can prevent the DTMF signals from being converted to audio signals to spare any human listeners from hearing the DTMF signals.

20 Claims, 5 Drawing Sheets

DATA TRANSFER DURING A CALL WITHOUT SIMULTANEOUS DATA CAPABILITIES

TECHNICAL FIELD

The present invention relates to communication systems and, more particularly, to voice communication systems that support data transfers in a voice channel.

BACKGROUND

Small, handheld computing devices have been steadily growing in popularity in recent years. The devices are known by different names, such as palmtops, pocket computers, personal digital assistants, personal organizers, H/PCs, or the like. Additionally, many portable telephone systems, such as cellular phones, incorporate sufficient computing capabilities to fall within the category of the small, handheld computing devices. These devices, hereinafter "mobile computing devices" provide much of the same functionality as their larger counterparts. In particular, mobile computing devices provide many functions to users including word processing, task management, spreadsheet processing, address book functions, Internet browsing, and calendaring, as well as many other functions in addition to voice communications.

During a phone call, the parties (i.e., people having the telephone call) may wish to use some of the additional functionality provided by the mobile computing devices. Some of these additional functions involve transfer of data between the parties' computing devices. However, one or more of the parties may have a mobile computing device that is only capable of using a voice channel (i.e., does not have the circuitry to use separate data channels that some service providers provide), or may not have subscribed to use such a separate data channel. Further, even if all of the parties support data transfers over a separate data channel, the use of the separate data channel may require that the parties terminate the telephone call and/or incur an additional charge for using the data channel.

SUMMARY

According to various aspects, systems and methods for transferring data over a voice channel during a voice communication connection (e.g., a telephone call) are provided. In one aspect, systems and methods are provided that allow a party to the voice communication to send arbitrary data to the other party(s) using dual-tone multi-frequency (DTMF) signals over a single voice communication channel. For example, the arbitrary data can include contact information, graphics, photographs, streaming media, interactive game information, location information (including universal resource locators), cached web pages, audio clips (including ring tones), etc.

In another aspect, some or all of the DTMF signals are uniquely mapped to groups of bits. For example, the DTMF signals for numbers "0" through "7" can be mapped to the corresponding three-bit binary representations of those numbers. The arbitrary data can be placed in a container with meta-data indicating the start and end of the data, the type of the data, the amount of data, error correction/detection information, security/authentication information, etc.

In yet another aspect, in receiving the DTMF signals over the voice communication channel, the DTMF signals are substantially prevented from being converted to audio signals. This aspect can help spare a human listener from hearing the DTMF signals, which may be disturbing or uncomfortable. This aspect may be implemented by filtering the received signal with band pass filters for each of the DTMF signals, disabling the voice/audio components, switching the received signal from the voice/audio components to a DTMF decoder, etc.

In still another aspect, once the arbitrary data has been recovered from the DTMF signals, the data is handled according to its type. For example, contact information may be stored in an address book used by a personal information manager application, cached web pages may be stored in a cache used by a browser application, interactive game data may be stored in a data store of a game application, etc.

Various embodiments may be implemented as a computer process, a computing system (not limited to mobile computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF ILLUSTRATED EMBODIMENTS

Embodiments are described more fully below with reference to the accompanying drawings, which form a part hereof, and which show specific exemplary non-limiting embodiments for practicing the invention. However, embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Figure 1:
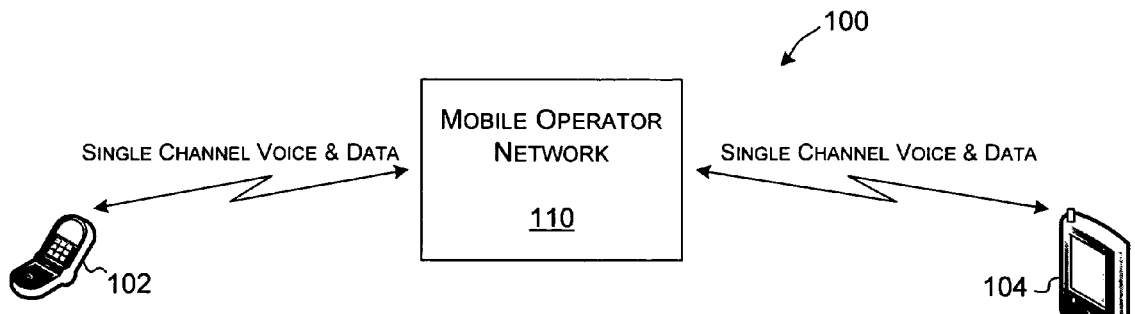
FIG. 1 is a diagram illustrating an exemplary voice communication system that supports data transfers in a voice channel, according to one embodiment.

FIG. 1 illustrates an exemplary voice communication system 100 that supports data transfers in a voice channel, according to one embodiment. In this exemplary embodiment, system 100 includes a first mobile computing device 102 (e.g., a cellular "smart" phone), and a second mobile computing device 104 (e.g. a cellular phone/personal digital assistant combination device). First and second mobile computing devices 102 and 104 can communicate with each other via one or more mobile operator networks 10 that provides cellular telephone services to subscribers.

In one embodiment, first and second mobile computing devices 102 and 104 can make a single voice channel connection with each other (e.g., a telephone call) via mobile operator network 10 in a conventional manner. However, in accordance with various embodiments, first and second mobile computing devices 102 and 104 can also transfer data over the single voice channel without terminating the single voice channel connection. This feature allows users to easily exchange arbitrary data such as a "vCard" (e.g., defined in the Electronic Business Card Version 2.1 Specification Sep. 18, 1996), URLs (universal resource locators), cached web pages, photographs and other graphics, interactive game data, electronic documents, streaming content, etc.

In some embodiments, a dual-tone multi-frequency (DTMF) encoding scheme is used to encode binary data into DTMF tones. For example, many standard telephone systems already have mechanisms (i.e., software, hardware or a combination of both) to detect DTMF signals representing the numbers "0" through "9", "#" and "*". Thus, in some embodiments, these mechanisms can be used to implement a mapping between each of the DTMF signals corresponding to the numbers "0" through "7" to a unique three-bit sequence. In one embodiment, the DTMF signal associated with each of the numbers "0" through "7" represents the three-bits needed to represent that number in binary form. In other embodiments, different mappings may be used (e.g. a Gray code mapping).

In alternative embodiments in which the DTMF mechanisms support all eight tones defined for standard DTMF telephone signaling (i.e., the low tones 697 Hz; 770 Hz; 852 Hz; 941 Hz; and the high tones 1209 Hz; 1336 Hz; 1477 Hz; and 1633 Hz), the DTMF mechanisms may be used to implement a mapping between four-bit sequences of data to unique DTMF signals formed from one low tone and one high tone.

Although described herein in combination with mobile computing device 100, in alternative embodiments the invention is used in combination with any number of computer systems capable of supporting voice communication (e.g., telephone communication), such as in desktop environments, laptop or notebook computer systems, multiprocessor systems, micro-processor based or programmable consumer electronics, network PCs, mini computers, handheld game devices (e.g., Gameboy® devices) and the like. Embodiments of the invention may also be practiced in distributed computing environments where tasks are performed by remote processing devices that are linked through a communications network in a distributed computing environment, programs may be located in both local and remote memory storage devices. To summarize, any computer system having a mechanism to support voice communication may incorporate the present invention.

Although the above embodiments may refer to a user of mobile computing devices, in other embodiments, a party to the telephone call need not be a person using a telephone or PDA-telephone combination device. For example, the other party may be an "automated attendant", a web service, etc.

Figure 2:
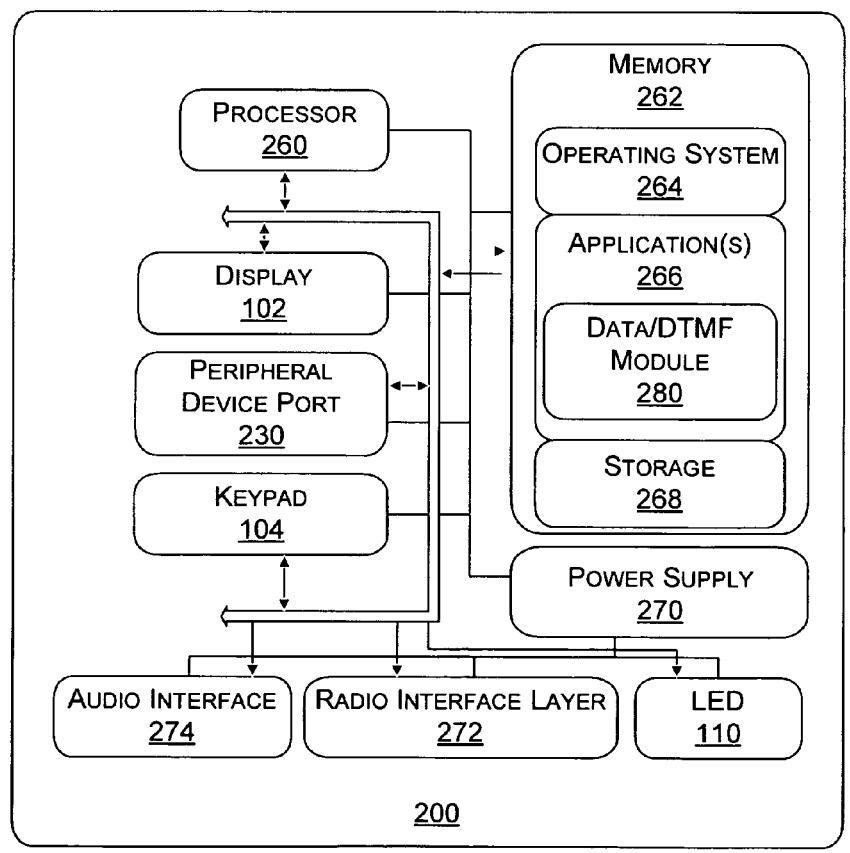
FIG. 2 is a block diagram illustrating components of a mobile computing device used in an embodiment.

FIG. 2 illustrates a system 200 used in an embodiment of the present invention, such as the mobile computing device shown in FIG. 1. That is, mobile computing device 100 (FIG. 1) can incorporate system 200 to implement an embodiment of the invention. For example, system 200 can be used in implementing a "smart phone" that can run one or more applications similar to those of a desktop or notebook computer such as, for example, browser, email, scheduling, instant messaging, and media player applications. System 200 can execute an OS such as, for example, Windows XP®, Windows Mobile 2003® or Windows CE®. In some embodiments, system 200 is integrated as a computing device, such as an integrated personal digital assistant (PDA) and wireless phone.

In this embodiment, system 200 has a processor 260, a memory 262, display 102, and keypad 104. Memory 262 generally includes both volatile memory (e.g., RAM) and non-volatile memory (e.g., ROM, Flash Memory, or the like). The system 200 includes an OS 264, which in this embodiment is resident in a flash memory portion of memory 262 and executes on processor 260. Keypad 104 may be a push button numeric dialing pad (such as on a typical telephone), a multi-key keyboard (such as a conventional keyboard), or may not be included in the mobile computing device in deference to a touch screen or stylus. Display 102 may be a liquid crystal display, or any other type of display commonly used in mobile computing devices. Display 102 may be touch-sensitive, and would then also act as an input device.

One or more application programs 266 are loaded into memory 262 and run on operating system 264. Examples of application programs include phone dialer programs, e-mail programs, PIM (personal information management) programs, word processing programs, spreadsheet programs, Internet browser programs, and so forth. In one embodiment, application programs 266 include a Data/DTMF module or application 280 that can support data transfers using DTMF signaling during a telephone call (as described above in conjunction with FIG. 1 for system 100). System 200 also includes non-volatile storage 268 within memory 262. Non-volatile storage 268 may be used to store persistent information that should not be lost if system 200 is powered down. Applications 266 may use and store information in non-volatile storage 268, such as e-mail or other messages used by an e-mail application, contact information used by a PIM, appointment information used by calendaring application 280, documents used by a word processing application, and the like. A synchronization application (not shown) also resides on system 200 and is programmed to interact with a corresponding synchronization application resident on a host computer to keep the information stored in non-volatile storage 268 synchronized with corresponding information stored at the host computer. In some embodiments, non-volatile storage 268 includes the aforementioned flash memory in which the OS (and possibly other software) is stored.

System 200 has a power supply 270, which may be implemented as one or more batteries. Power supply 270 might further include an external power source, such as an AC adapter or a powered docking cradle that supplements or recharges the batteries.

System 200 is also shown with two types of external notification mechanisms: LED 110, and an audio interface 274 that can be used with a speaker (not shown) to provide audio notifications. These devices may be directly coupled to power supply 270 so that when activated, they remain on for a duration dictated by the notification mechanism even though processor 260 and other components might shut down to conserve battery power. LED 110 may be programmed to remain on indefinitely until the user takes action to indicate the powered-on status of the device. Audio interface 274 is used to provide audible signals to and receive audible signals from the user. For example, in addition to being coupled to the speaker, audio interface 274 may also be coupled to a microphone to receive audible input, such as to facilitate a telephone conversation.

System 200 also includes a radio 272 that performs the function of transmitting and receiving radio frequency communications. Radio 272 facilitates wireless connectivity between system 200 and the "outside world", via a communications carrier or service provider. Transmissions to and from radio 272 are conducted under control of OS 264. In other words, communications received by radio 272 may be disseminated to application programs 266 via OS 264, and vice versa.

Radio 272 allows system 200 to communicate with other computing devices, such as over a network. Radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 3:
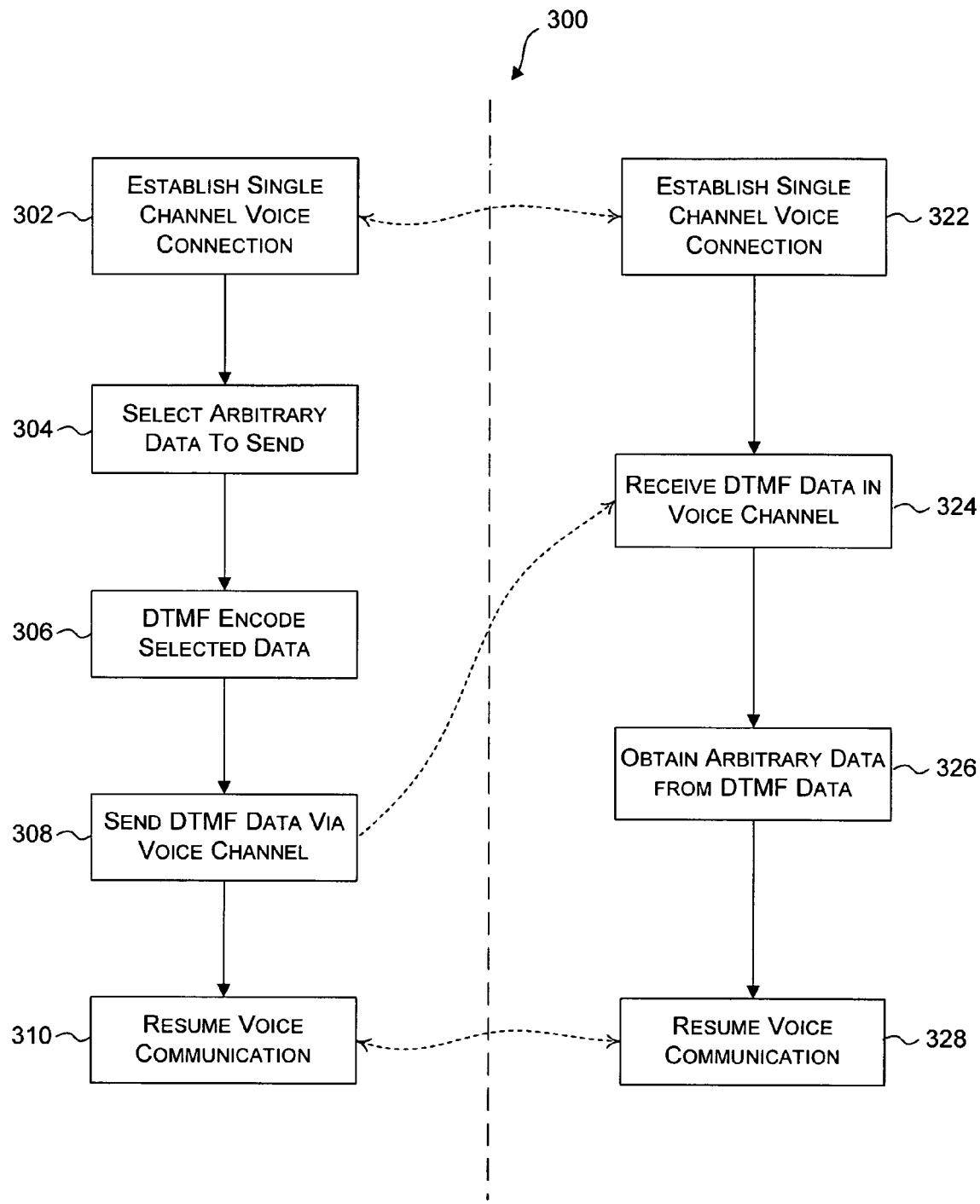
FIG. 3 is a flow diagram illustrating operational flow of a voice communication system that supports data transfers in a voice channel, according to one embodiment.

FIG. 3 illustrates an operational flow 300 of a voice communication system that supports data transfers in a voice channel, according to one embodiment. Operational flow 300 may be performed in any suitable computing environment. For example, operational flow 300 may be executed by system 100 (FIG. 1) to transfer arbitrary data over a single voice channel using DTMF signaling. Therefore, the description of operational flow 300 may refer to at least one of the components of FIG. 1. However, any such reference to components of FIG. 1 is for descriptive purposes only, and it is to be understood that the implementations of FIG. 1 are a non-limiting environment for operational flow 300.

As can be seen in FIG. 3, operation flow 300 includes two component operational flows: (1) an operational flow to send arbitrary data (i.e., the component flow diagram on the left side of the drawing); and (2) an operational flow to receive arbitrary data (i.e., the component flow diagram on the right side of the drawing). These component operational flows "run" concurrently. In some embodiments, operational flow (1) is performed by one mobile computing device (e.g., mobile computing device 102 of FIG. 1) of a pair of mobile computing devices that have established a telephone connection, while operational flow (2) is performed by the other mobile computing device (e.g., mobile computing device 104 of FIG. 1).

Sending Arbitrary Data

At a block 302, a sending party (referring to sending of arbitrary data that occurs later in operation flow 300) participates in establishing a single voice channel connection with one or more parties (e.g., calling and called parties) to engage in voice communication in which the connected parties can both send and receive voice data. For example, the single voice channel connection may be a standard wired and/or wireless telephone connection. In one embodiment, a party using a mobile computing device such as mobile computing device 102 (FIG. 1) calls another party such as the party using mobile computing device 104 (FIG. 1) via a mobile operator network such as mobile operator network 110 (FIG. 1). In this embodiment, the mobile computing devices have only a single voice channel that is available to the users to transfer information (i.e., they do not have a separate data channel). In some other embodiments, one or more of the mobile computing devices may support a separate data communication channel, which would be unused in transferring the arbitrary data.

In some embodiments, a party need not be a human operator using a computing device or mobile computing device, but rather, in some embodiments a party can also include automated telephone attendants, web servers, and etc. that can handle voice communications such as telephone calls. Operational flow 300 can then proceed to a block 304.

At block 304, arbitrary data to send to one or more receiving parties is selected. In one embodiment, the sending party selects data stored in a mobile computing device such as mobile computing device 102 to send to the party using a mobile computing device such as mobile computing device 104. This data can be any suitable arbitrary data such as one or more of: a vCard, a URL, a cached web page, a photograph and other graphic (e.g., a jpeg file), interactive game data, an electronic document, streaming content, etc., including more than one of each. Operational flow 300 can then proceed to a block 306.

At block 306, the arbitrary data is DTMF encoded. In one embodiment, the sending party's computing device includes a DTMF encoder (which can be part of a DTMF codec) to map portions of the arbitrary data into DTMF tones that can then be transmitted to the one or more receiving parties via a single voice channel connection. For example, in some embodiments, three-bit portions of the arbitrary data are mapped to a unique DTMF signal. Accordingly, the arbitrary data can be encoded as a series of DTMF signals. For example, in one embodiment, each group of three bits of the arbitrary data can represent a binary-coded decimal digit, which in turn is represented by the standard DTMF signal for that digit. In other embodiments, different encoding schemes may be used to map three-bit groups of arbitrary data to DTMF tones. Operational flow 300 can then proceed to a block 308.

At block 308, the DTMF-encoded data is sent to the recipient(s) via the single voice channel connection. In one embodiment, the DTMF-encoded data is encapsulated in a data container such as a block or a frame, with additional DTMF encoded meta-data that indicates, for example, the start and/or end of the container. The DTMF-encoded container can then be transmitted to the intended recipient(s) over the single voice channel connection. This embodiment can be advantageously used, for example, in scenarios in which the parties participating in a cellular telephone call wish to conveniently transfer arbitrary data: (a) without ending their telephone call; (b) using a separate data channel (which typically would require all of the participating parties to have computing devices to support the separate data channel and to be subscribers of the separate data channel); and (c) using only relatively inexpensive "voice" minutes (depending on their subscription plans) rather than a "text" service (e.g., short message service or SMS) that may incur separate charges. Operational flow 300 can then proceed to a block 310.

At block 310, voice communication over the voice channel connection is resumed. In one embodiment, after the arbitrary data is sent, the parties can then resume their conversation.

Receiving Arbitrary Data

At a block 322, a receiving party (referring to receiving arbitrary data as described later in operational flow 300) participates in establishing a single channel voice channel connection (e.g., a telephone connection) substantially as described above in conjunction with block 302. A dashed double-headed arrow in FIG. 3 indicates the interaction between blocks 302 and 322 in establishing the voice channel connection. Operational flow 300 can then proceed to a block 324.

At block 324, DTMF-encoded data is received. A dashed arrow from block 308 to block 324 shown in FIG. 3 indicates the DTMF-encoded data being sent to the receiving party's computing device (e.g., a mobile computing device such as a cell phone). In one embodiment, the receiving party's computing device can detect the DTMF signals and substantially block them from reaching the receiving party in the form of acoustic signals. Any suitable mechanism to block the DTMF signals can be used such as, for example: filtering out the DTMF signals, disabling the speakers or headset, etc. The operation can advantageously protect the receiving party from hearing the DTMF signals that can be startling or obnoxious to human parties. Operational flow 300 can then proceed to a block 326.

At block 326, the arbitrary data is obtained from the received DTMF data. In one embodiment, the receiving party's computing device includes a DTMF decoder corresponding to the DTMF encoder of the sending party's computing device. In one embodiment, after the DTMF decoding, the received arbitrary data is then stored at the appropriate location. For example, if the data represented a vCard, the vCard data could be appropriately stored in a data store (e.g., an address book or contact list) used by a PIM application; URLs and/or cached web pages may be stored in a cache used by a browser application; etc. The data can be appropriately routed based on metadata that was DTMF-encoded and sent along with the arbitrary data. Operational flow 300 can then proceed to a block 328.

At block 328, voice communication over the voice channel connection is resumed. In one embodiment, after the arbitrary data is sent, the parties can then resume their conversation. A dashed double-headed arrow in FIG. 3 indicates the interaction between blocks 310 and 328 in resuming the voice communication over the single voice channel connection.

Although process 300 is illustrated and described sequentially in a particular order, in other embodiments, the operations described in the blocks may be performed in different orders, multiple times, and/or in parallel. Further, one or more operations described in the blocks may be omitted or combined in some embodiments.

Figure 4:
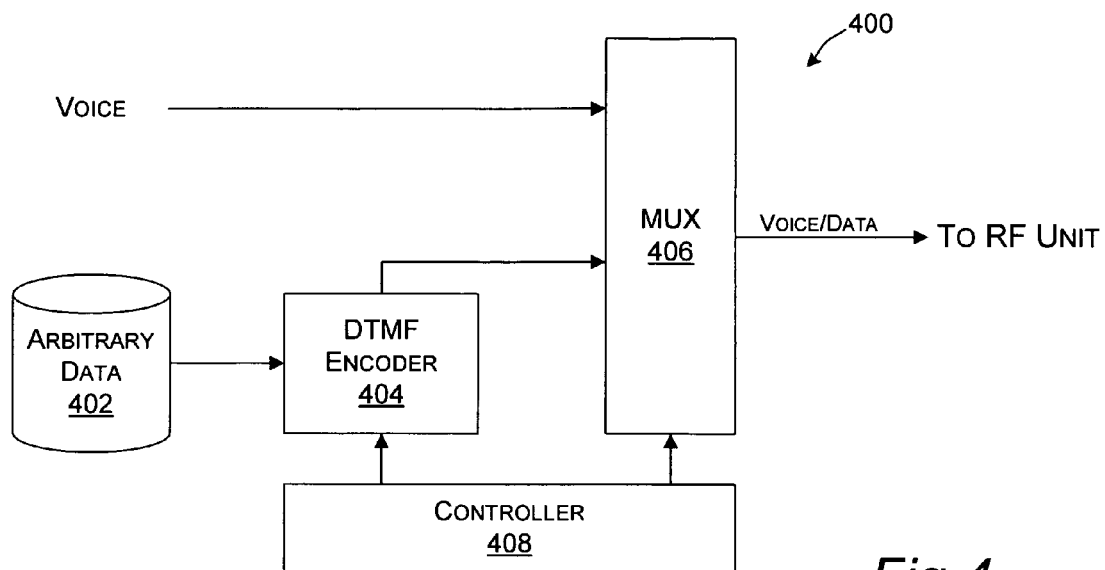
FIG. 4 is a block diagram illustrating components of a data sender portion of a voice communication system that supports data transfers in a voice channel, according to one embodiment.

Example Components for Sending and Receiving Arbitrary Data Using DTMF Signaling FIG. 4 illustrates exemplary components of a data sender portion 400 of a voice communication system that supports data transfers in a single voice channel, according to one embodiment. In this embodiment, data sender portion 400 includes a data store 402 for storing arbitrary data, a DTMF encoder 404, a multiplexer (MUX) 406, and a controller 408. In various embodiments, these components are implemented as software components or modules, hardware components or both. In this exemplary embodiment, data sender portion 400 is implemented in a mobile computing platform such as mobile computing platform 102 (FIG. 1).

In operation during a voice communication (e.g., a telephone call), controller 408 causes DTMF encoder 404 to be inactive or disabled, and MUX 406 to select a voice input signal. MUX 406 outputs the selected signal (i.e., the voice input signal at this point in this exemplary operation) to a RF unit for transmission to a mobile computing platform such as mobile computing platform 104 (FIG. 1). In this embodiment, the voice signal is sent to the receiving device in any suitable manner.

In this exemplary scenario, the user wishes to send some arbitrary data to the other party and operates a UI to find and select the data, which in this example is stored in data store 402. In this embodiment, data store 402 is used by another application loaded in the user's computing device (i.e., not a dedicated data store for data transfers over the voice channel). In response to the user's input to transmit the selected arbitrary data, controller 408 causes DTMF encoder 404 to receive and DTMF-encode the selected data. In one embodiment, DTMF encoder 404 encodes the data as described above in conjunction with block 306 of FIG. 3. In addition, controller 408 causes multiplexer 406 to select the DTMF-encoded data from DTMF encoder 404 (and thereby de-select the voice signal). Multiplexer 406 outputs the selected DTMF-encoded data signal to the radio frequency (RF) unit for transmission.

Figure 5:
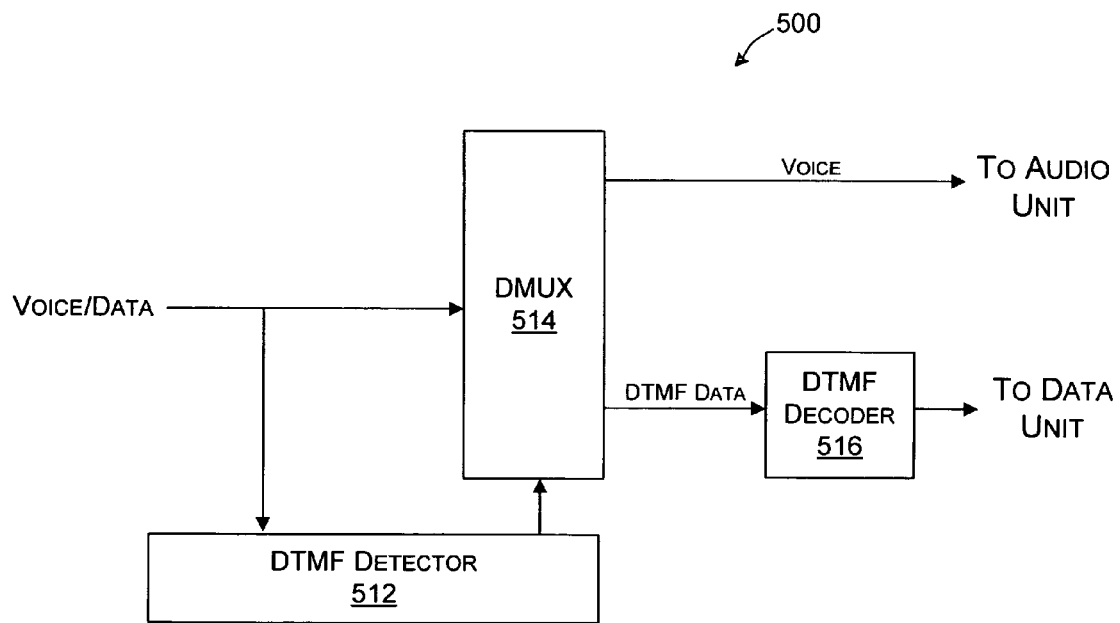
FIG. 5 is a block diagram illustrating components of a data receiver portion of a voice communication system that supports data transfers in a voice channel, according to one embodiment.

FIG. 5 illustrates exemplary components of a data receiver portion 500 of a voice communication system that supports data transfers in a voice channel, according to one embodiment. In this embodiment, data receiver portion 500 includes a DTMF detector 512 for detecting the presence of DTMF signals in a received signal, a demultiplexer (DMUX) 514, and a DTMF decoder 516. In various embodiments, these components are implemented as software components or modules, hardware components or both. In this exemplary embodiment, data receiver portion 500 is implemented in a mobile computing platform such as mobile computing platform 102 (FIG. 1).

In operation during a voice communication (e.g., a telephone call), DTMF detector 512 and demultiplexer 514 receive a signal via a single voice channel. In this embodiment, demultiplexer 514 routes the received signal to a voice/audio unit (not shown) by default. If during the reception of a signal via the single voice channel, DTMF detector 512 detects a DTMF signal, it causes demultiplexer 514 to route the received signal to DTMF decoder 516. In one embodiment, DTMF detector 512 is configured to detect a predetermined "start of data sequence" of DTMF tones before causing demultiplexer 514 to route the received signal to DTMF decoder 516. In this way, the DTMF signals are prevented from being converted to audio signals that could be disturbing to a human listening to the voice signal.

Example Operational Flow in Sending Arbitrary Data

Figure 6:
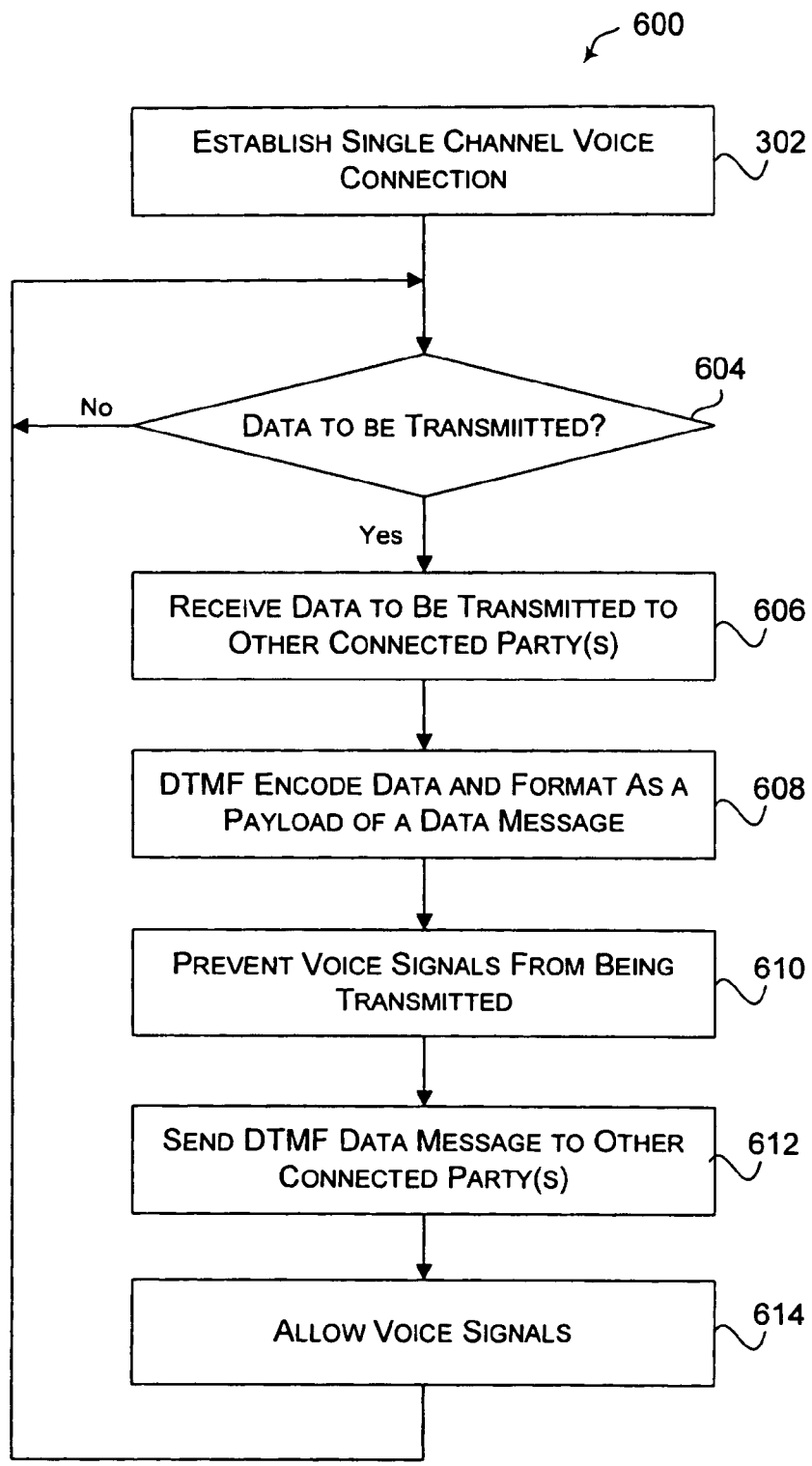
FIG. 6 is a flow diagram illustrating operational flow for sending data in a voice communication system that supports data transfers in a voice channel, according to one embodiment.

FIG. 6 illustrates operational flow 600 for sending data in a voice communication system that supports data transfers in a voice channel, according to one embodiment. Operational flow 600 is similar to the "send" portion of operational flow 300 (FIG. 3), but describes a particular implementation of the "send" portion of operational flow 300 in more detail. Operational flow 600 may be performed in any suitable computing environment. For example, operational flow 600 may be executed by system 100 (FIG. 1) to send arbitrary data over a single voice channel using DTMF signaling. Therefore, the description of operational flow 600 may refer to at least one of the components of FIG. 1. However, any such reference to components of FIG. 1 is for descriptive purposes only, and it is to be understood that the implementations of FIG. 1 are a non-limiting environment for operational flow 600.

At block 302, a sending party (referring to sending of arbitrary data that occurs later in operation flow 600) participates in establishing a single voice channel connection with one or more parties (e.g., the calling and called parties) to engage in voice communication in which the connected parties can both send and receive voice data. An embodiment of block 302 has been previously described in conjunction with FIG. 3. Operational flow 600 can then proceed to a block 604.

At block 604, it is determined whether arbitrary data is to be transmitted to other receiving party(s) participating in the voice communication session. In one embodiment, the sending party's computing device is configured to detect and respond to user input in selecting and sending arbitrary data over the voice communication channel. For example, the sending party can select data stored in the mobile computing device such as mobile computing device 102 to send to the party using a mobile computing device such as mobile computing device 104. This data can be any suitable arbitrary data such as one or more of: a vCard, a URL, a cached web page, a photograph and other graphic (e.g., a jpeg file), interactive game data, an electronic document, streaming content, etc., including more than one of each.

This arbitrary data can be stored in any suitable location within the computing device being used by the sending party. For example, vCard data may be stored in a data store (e.g., an address book or contact list) used by a personal information management (PIM) application; URLs and/or cached web pages may be stored in a cache used by a browser application, etc. The data need not be stored in a special data store dedicated for sending data to a recipient; although in some embodiments "DTMF send-able" data may be stored in a special data store. In one embodiment, the sending party can navigate through a user interface (UI) presented by an application such as Data/DTMF module 280 (FIG. 2) to find and select the arbitrary data to be sent. If there is no data to be transmitted during the voice communication session, operational flow 600 returns to the start of block 604. Otherwise, operational flow 600 can then proceed to a block 606.

At block 606, the arbitrary data to be transmitted over the voice channel is obtained. For example, the arbitrary data selected by the sending party is accessed and provided to a DTMF encoder such as DTMF encoder 404 (FIG. 4). In one embodiment, an application such as the aforementioned Data/DTMF module 280 accesses the arbitrary data and provides it to the DTMF encoder (which can be part of Data/DTMF module 280 in some embodiments). Operational flow 600 can then proceed to a block 608.

At block 608, the arbitrary data is DTMF encoded. In one embodiment, the aforementioned DTMF encoder (which can be part of a DTMF CODEC) maps portions of the arbitrary data into DTMF tones that can then be transmitted to the one or more receiving parties via a single voice channel connection. For example, in some embodiments, three-bit portions of the arbitrary data are mapped to a unique DTMF signal as previously described in conjunction with block 306 (FIG. 3). Accordingly, the arbitrary data can be encoded as a series of DTMF signals. Operational flow 600 can then proceed to a block 610.

At block 610, voice signals (or other audio signals picked up by the microphone used in receiving the user's spoken words/sounds) are prevented from being transmitted. In one embodiment, the microphone can be disabled when arbitrary data is to be sent. In other embodiments, the voice signal path may be switched so as to block the voice signal from reaching the RF unit using a switch or a multiplexer (such as multiplexer 406 of FIG. 4). In still other embodiments, the voice signal may be band-pass filtered to block frequency components about the DTMF frequencies. Operational flow 600 can then proceed to a block 612.

At block 612, the DTMF-encoded data from block 608 is sent to the recipient(s) via the single voice channel connection. In one embodiment, the DTMF-encoded data is encapsulated in a data container such as a block or a frame, with additional DTMF encoded information or metadata that indicates, for example, one or more of: the start and/or end of the container; the type of data (e.g., a vCard, a URL, etc.); error detection/correction data; security/authentication mechanisms (tokens, signatures, etc.). For example, in some embodiments the container includes a preselected sequence of DTMF signals that indicate the start of the container. In this way, the receiving party or parties will be able to distinguish between an arbitrary data transfer and, for example, DTMF control signals used for other purposes (e.g., interactive voice response [IVR] systems). Still further, in some band-pass filtering embodiments, the receiving party can be notified that the audio quality (from a listener's point of view) may be degraded due to the "missing" frequency bands. For example, an audio notification such as a start tone (or start and stop tones) can be used to indicate the start (or end) of audio quality degradation. The DTMF-encoded container can then be transmitted to the intended recipient(s) over the single voice channel connection. This embodiment is similar to block 308 previously described in conjunction with FIG. 3. Operational flow 600 can then proceed to a block 614.

At block 614, voice signals (or other audio signals picked up by the microphone used in receiving the user's spoken words/sounds) are then allowed to be transmitted when all of the arbitrary data has been sent. Thus, normal voice communication between the parties can be resumed. Operational flow 600 can then return to block 604 to determine whether more data is to be transmitted over the voice channel using DTMF signaling.

Although process 600 is illustrated and described sequentially in a particular order, in other embodiments, the operations described in the blocks may be performed in different orders, multiple times, and/or in parallel. Further, one or more operations described in the blocks may be omitted or combined in some embodiments.

Example Operational Flow in Receiving Arbitrary Data

Figure 7:
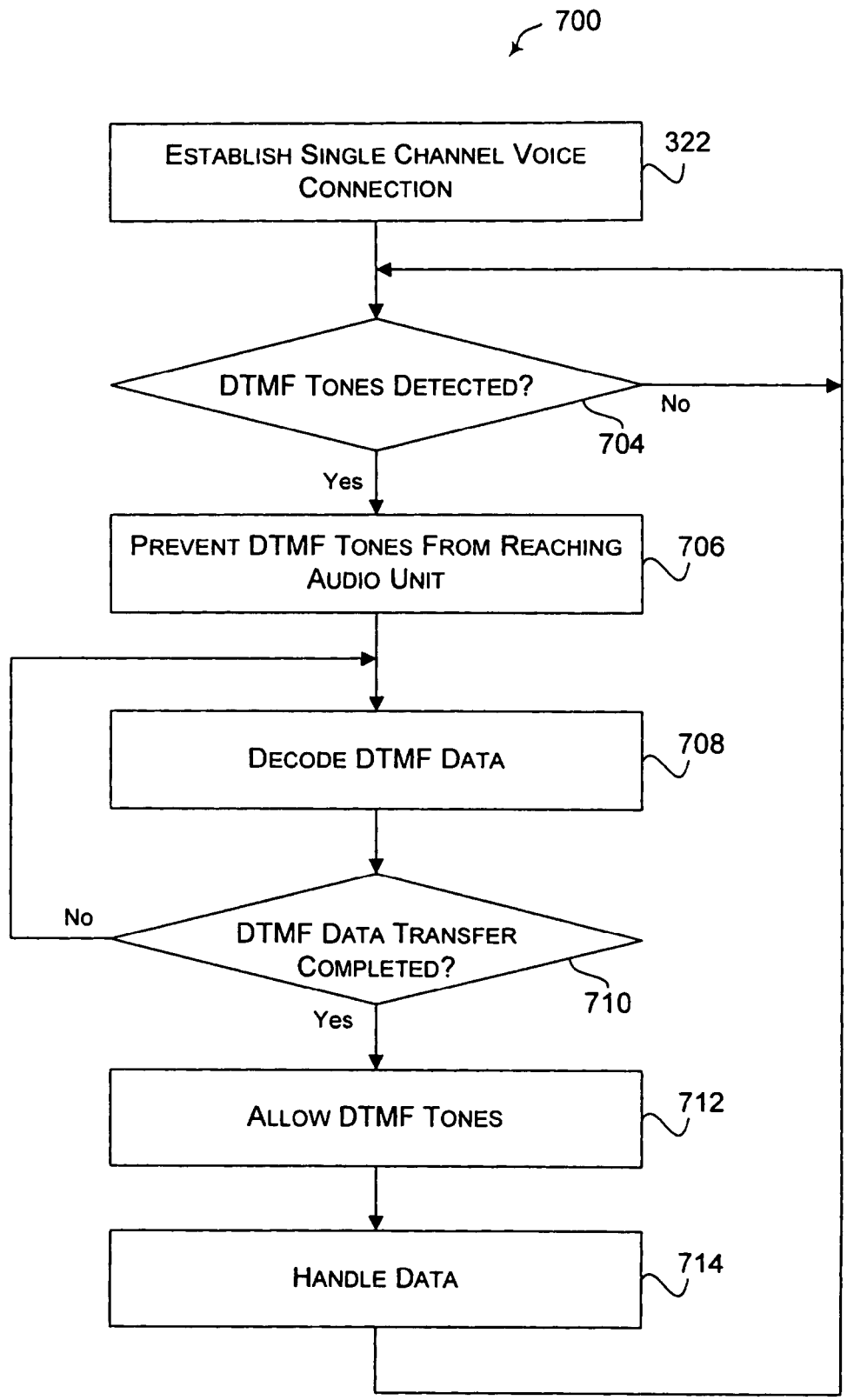
FIG. 7 is a flow diagram illustrating operational flow for receiving data in a voice communication system that supports data transfers in a voice channel, according to one embodiment.

FIG. 7 illustrates operational flow 700 for receiving data in a voice communication system that supports data transfers in a voice channel, according to one embodiment. Operational flow 700 is similar to the "receive" portion of operational flow 300 (FIG. 3), but describes a particular implementation of the receive portion of operation flow 300 in more detail. Operational flow 700 may be performed in any suitable computing environment. For example, operational flow 700 may be executed by system 100 (FIG. 1) to receive arbitrary data over a single voice channel using DTMF signaling. Therefore, the description of operational flow 700 may refer to at least one of the components of FIG. 1. However, any such reference to components of FIG. 1 is for descriptive purposes only, and it is to be understood that the implementations of FIG. 1 are a non-limiting environment for operational flow 700.

At block 322, a receiving party (referring to receiving arbitrary data as described later in operational flow 300) participates in establishing a single channel voice channel connection (e.g., a telephone connection) substantially as previously described in conjunction with FIG. 3. The parties that have established the connection can engage in a voice communication session such as, for example, a standard telephone call. Operational flow 700 can then proceed to a block 704.

At block 704, it is determined whether DTMF signals are being sent in the voice channel. In one embodiment, the receiving party has a DTMF detector such as DTMF detector 512 (FIG. 5) that is configured to detect a predetermined "start" sequence of DTMF signals. In this way, a receiving party will be able to distinguish between an arbitrary data transfer and, for example, DTMF control signals used for other purposes (e.g., IVR systems). If the start sequence of DTMF signals is not detected, operational flow 700 returns to the beginning of block 704, allowing the voice communication session to continue in a standard manner. However, if the start sequence is detected, operational flow 700 can then proceed to a block 706.

At block 706, DMTF signals are prevented from being presented as audio signals to the receiving party. In one embodiment, the receiving party's computing device can substantially block the DTMF signals from reaching the voice/acoustic unit (not shown) such as a speaker, headset or earpiece. Any suitable mechanism to block the DTMF signals can be used such as, for example: filtering out the DTMF signals using appropriate band pass filters; disabling the audio unit (e.g., speaker or speaker driver circuitry); switching or multiplexing the received signal either to a voice/audio unit or to a DTMF decoder depending on whether DTMF signals were detected in the received signal. The operation can advantageously protect the receiving party from hearing the DTMF signals. Operational flow 700 can then proceed to a block 708.

At block 708, received DTMF data is decoded. In one embodiment, the receiving party's computing device includes a DTMF decoder such as DTMF decoder 516 (FIG. 5), which corresponds to the DTMF encoder of the sending party's computing device. In one embodiment, block 708 is similar to block 326 previously described in conjunction with FIG. 3. Operational flow 700 can then proceed to a block 710.

At block 710, it is determined whether all of the received DTMF data has been decoded. If not, operational flow 700 returns to block 708 to continue to receive/decode DTMF data. However, if all of the DTMF data has been received and decoded, operational flow 700 can proceed to a block 712.

At block 712, DTMF signals are no longer actively prevented from being presented as audio signals to the receiving party. For example, speakers can be enabled to allow all audio signals to be heard by the receiving party. Operational flow 700 can then proceed to a block 714.

At a block 714, the decoded data is then appropriately handled. In one embodiment, after the DTMF decoding, the received arbitrary data is then stored at the appropriate location. For example, if the data represented a vCard, the vCard data could be appropriately stored in a data store (e.g., an address book or contact list) used by a PIM application; URLs and/or cached web pages may be stored in a cache used by a browser application; etc. The data can be appropriately routed based on metadata that was DTMF-encoded and sent along with the arbitrary data. Operational flow 700 can then return to block 704 to resume standard voice communication over the voice channel connection and wait for more DTMF signals to be received.

Although process 700 is illustrated and described sequentially in a particular order, in other embodiments, the operations described in the blocks may be performed in different orders, multiple times, and/or in parallel. Further, one or more operations described in the blocks may be omitted or combined in some embodiments.

Although the invention has been described in language specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A method for sending arbitrary data over a single voice channel, the method comprising:
    participating in a voice communication session using the single voice channel;
    selecting the arbitrary data from a memory to send over the single voice channel;
    wherein the arbitrary data comprises a plurality of portions that each comprise bits;
    encoding the arbitrary data using a dual-tone multi-frequency (DTMF) encoding scheme; wherein encoding the arbitrary data using the DTMF encoding scheme comprises mapping each portion of the arbitrary data to a DTMF tone that represents a value of the portion of the arbitrary data; wherein a combination of each of the DTMF tones used in the mapping encodes all of the bits of the arbitrary data; and
    sending the DTMF-encoded data over the single voice channel without terminating the voice communication session.

2. The method of claim 1 further comprising sending a predetermined sequence of DTMF signals to indicate a start of a data transfer.

3. The method of claim 1 further comprising preventing a voice signal from being sent over the single voice channel while the DTMF signal is being sent over the single voice channel.

4. The method of claim 1 further comprising accessing the arbitrary data from a data store used by an application associated with the arbitrary data.

5. The method of claim 1 further comprising sending cached web page data to a participant of the voice communication session over the single voice channel for viewing by the participant, wherein the participant does not access an external network to view the web page.

6. The method of claim 1 wherein the arbitrary data includes data used in an interactive game being played by participants of the voice communication session.

7. The method of claim 1 wherein the DTMF encoding comprises a mapping each possible value of a fixed number of bits to a unique DTMF signal.

8. The method of claim 7 wherein the fixed number of bits is selected from the group comprising three-bit or four-bits.

9. A memory having stored thereon instructions that when executed perform operations implementing the method of claim 1.

10. A method for receiving arbitrary data over a single voice channel, the method comprising:
    participating in a voice communication session using the single voice channel;
    receiving -tone multi-frequency (DTMF)-encoded data over the single voice channel without terminating the voice communication session, wherein the DTMF encoding comprises mapping the arbitrary data to a combination of DTMF tones that encodes all of the bits of data; wherein each portion of the arbitrary data is a fixed number of bits that is encoded to a DTMF tone; and decoding the DTMF-encoded data.

11. The method of claim 10 further comprising determining whether a predetermined sequence of DTMF signals has been received, wherein the predetermined sequence indicates a start of a data transfer.

12. The method of claim 10 further comprising preventing a received DTMF signal from being converted to an audio signal while the DTMF signal is being sent over the single voice channel.

13. The method of claim 10 further comprising storing the data in a data store used by an application associated with the data's type.

14. The method of claim 10 further comprising receiving a cached web page over the single voice channel and displaying the web page without accessing an external network to view the web page.

15. The method of claim 10 wherein the data includes data used in an interactive game being played by participants of the voice communication session.

16. The method of claim 10 wherein the fixed number of bits is selected from the group comprising three-bit or four-bits.

17. A memory having stored thereon instructions that when executed perform operations implementing the method of claim 10.

18. A system to transfer data over a single voice channel, the system comprising:
   means for participating in a voice communication session using the single voice channel;
   means for receiving -tone multi-frequency (DTMF)-encoded data over the single voice channel without terminating the voice communication session, wherein the DTMF encoding comprises mapping the data to DTMF tones that encodes all of the bits of data;
wherein each portion of the arbitrary data is a fixed number of bits that is encoded to a DTMF tone; and
   means for decoding the DTMF-encoded data.

19. The system of claim 18 wherein the fixed number of bits is selected from the group comprising three-bit or four-bits.

20. The system of claim 18 further comprising means for preventing a received DTMF signal from being converted to an audio signal while the DTMF signal is being sent over the single voice channel.

* * * * *